(12) United States Patent
Ishikawa et al.

(10) Patent No.: US 9,116,015 B2
(45) Date of Patent: Aug. 25, 2015

(54) DISPLAY SYSTEM FOR WORK VEHICLE HAVING A DISPLAY SWITCHING COMMAND DEVICE FOR SWITCHING A DISPLAY IN A DISPLAY DEVICE

(75) Inventors: Shinnosuke Ishikawa, Sakai (JP); Eiji Nishi, Kawachinagano (JP); Toshiya Fukumoto, Takarazuka (JP); Yuji Tomiyama, Sakai (JP); Katsuhiko Honda, Tondabayashi (JP); Nobuyuki Okabe, Izumi (JP)

(73) Assignee: Kubota Corporation, Osaka (JP)

( * ) Notice: Subject to any disclaimer, the term of this patent is extended or adjusted under 35 U.S.C. 154(b) by 1145 days.

(21) Appl. No.: 12/556,276

(22) Filed: Sep. 9, 2009

(65) Prior Publication Data
US 2010/0191404 A1  Jul. 29, 2010

(30) Foreign Application Priority Data

Jan. 29, 2009  (JP) ................................. 2009-018567

(51) Int. Cl.
*G06F 7/00* (2006.01)
*G01D 7/02* (2006.01)
*B60K 35/00* (2006.01)
*B60K 37/06* (2006.01)

(52) U.S. Cl.
CPC *G01D 7/02* (2013.01); *B60K 35/00* (2013.01); *B60K 37/06* (2013.01); *B60K 2350/1004* (2013.01); *B60K 2350/1064* (2013.01); *B60K 2350/1092* (2013.01); *B60K 2350/35* (2013.01); *B60K 2350/901* (2013.01)

(58) Field of Classification Search
CPC .................. B60K 35/00; B60K 37/06; B60K 2350/1004; B60K 2350/1092; G07C 5/02; G07C 5/06; G07C 5/08; G07C 5/0841; G07C 5/085; G01M 15/05
USPC ................. 701/123, 29.1, 29.4, 99, 102, 112; 340/439, 461, 462, 691.6
See application file for complete search history.

(56) References Cited

U.S. PATENT DOCUMENTS 4,307,452 A * 12/1981 Mizote ........................... 701/123
4,551,803 A * 11/1985 Hosaka et al. ................. 701/105
4,630,577 A * 12/1986 Cornacchia ................. 123/179.3

(Continued)

FOREIGN PATENT DOCUMENTS

JP              436617 A     2/1992
JP           200137302       2/2001

(Continued)

*Primary Examiner* — Thomas G Black
*Assistant Examiner* — Sze-Hon Kong
(74) *Attorney, Agent, or Firm* — The Webb Law Firm

(57) ABSTRACT

A display system for a work vehicle is disclosed including a display device (43) having an information display area (49), a display control unit (44) for controlling the display device, and a display switching command device (52A) which outputs a display switching command for switching a display in the display device. The display control unit (44) selects and sets, based on an output from the display switching command device (52A), one or more of an operating time display mode for displaying an operating time of an engine, an instantaneous fuel consumption display mode for displaying an instantaneous fuel consumption, an average fuel consumption display mode for displaying an average fuel consumption, and an amount of used fuel display mode for displaying an amount of used fuel, as a display mode for the information display area (49).

8 Claims, 7 Drawing Sheets

(56) References Cited

U.S. PATENT DOCUMENTS

| | | | |
|---|---|---|---|
| 4,663,718 A * | 5/1987 | Augello et al. | 701/527 |
| 4,721,083 A * | 1/1988 | Hosaka | 477/111 |
| 4,732,055 A * | 3/1988 | Tateno et al. | 477/73 |
| 4,943,924 A * | 7/1990 | Kanegae et al. | 701/115 |
| 4,989,146 A * | 1/1991 | Imajo | 701/31.5 |
| 5,017,916 A * | 5/1991 | Londt et al. | 340/870.13 |
| 5,060,156 A * | 10/1991 | Vajgart et al. | 701/29.5 |
| 5,063,381 A * | 11/1991 | Ito | 340/984 |
| 5,091,857 A * | 2/1992 | Katayama et al. | 701/112 |
| 5,309,139 A * | 5/1994 | Austin | 340/462 |
| 5,463,551 A * | 10/1995 | Milunas | 701/91 |
| 5,781,872 A * | 7/1998 | Konishi et al. | 701/36 |
| 6,037,864 A * | 3/2000 | Sem et al. | 340/457.4 |
| 6,055,470 A * | 4/2000 | Londot et al. | 701/33.4 |
| 6,157,890 A * | 12/2000 | Nakai et al. | 701/408 |
| 6,253,601 B1 * | 7/2001 | Wang et al. | 73/114.55 |
| 6,283,092 B1 * | 9/2001 | Jung | 123/339.15 |
| 6,320,497 B1 | 11/2001 | Fukumoto et al. | |
| 6,601,442 B1 * | 8/2003 | Decker et al. | 73/114.15 |
| 6,677,854 B2 * | 1/2004 | Dix | 340/438 |
| 6,766,231 B2 * | 7/2004 | Nakagawa et al. | 701/29.4 |
| 6,842,677 B2 * | 1/2005 | Pathare | 701/36 |
| 6,968,259 B2 * | 11/2005 | Simons et al. | 702/184 |
| 6,975,936 B2 * | 12/2005 | Akuzawa et al. | 701/114 |
| 7,112,894 B2 * | 9/2006 | Mc Cullough et al. | 307/10.1 |
| 7,237,203 B1 * | 6/2007 | Kuenzner | 715/764 |
| RE39,845 E * | 9/2007 | Hasfjord et al. | 340/438 |
| 7,346,442 B2 * | 3/2008 | Higashimata et al. | 701/67 |
| 7,487,033 B2 * | 2/2009 | Hijikata | 701/113 |
| 7,542,843 B2 * | 6/2009 | Malone et al. | 701/112 |
| 7,631,552 B2 * | 12/2009 | Keski-Hynnila et al. | 73/114.74 |
| 7,657,841 B2 * | 2/2010 | Shibamori et al. | 715/771 |
| 7,742,857 B2 * | 6/2010 | Iwamoto et al. | 701/36 |
| 7,772,970 B2 * | 8/2010 | Masuda et al. | 340/439 |
| 8,240,738 B2 * | 8/2012 | Shiratori et al. | 296/70 |
| 8,352,150 B2 * | 1/2013 | Hijikata | 701/102 |
| 8,536,996 B2 * | 9/2013 | Watson et al. | 340/462 |
| 2003/0001750 A1 * | 1/2003 | Ishimoto et al. | 340/691.6 |
| 2003/0093204 A1 * | 5/2003 | Adachi et al. | 701/50 |
| 2007/0208468 A1 * | 9/2007 | Sankaran et al. | 701/29 |
| 2008/0300768 A1 * | 12/2008 | Hijikata | 701/102 |
| 2010/0161196 A1 * | 6/2010 | Goericke et al. | 701/99 |

FOREIGN PATENT DOCUMENTS

| | | |
|---|---|---|
| JP | 2001236054 A | 8/2001 |
| JP | 2005157742 A | 6/2005 |
| JP | 2006131209 A | 5/2006 |
| JP | 2008237039 A | 10/2008 |

* cited by examiner

DISPLAY SYSTEM FOR WORK VEHICLE HAVING A DISPLAY SWITCHING COMMAND DEVICE FOR SWITCHING A DISPLAY IN A DISPLAY DEVICE

BACKGROUND OF THE INVENTION

1. Field of the Invention

The present invention relates to a display system for a work vehicle including a display device having an information display area, a display control unit which controls the display device, and a display switching command device which outputs a display switching command for changing the display in the display device.

2. Description of the Related Art

A work vehicles, such as a tractor, includes a display system including a liquid crystal display with a plurality of information display areas for displaying information such as engine operating time and the amount of remaining fuel, on an instrument panel unit having a tachometer which displays engine rotational speed, various kinds of indicator lamps, etc. For example, such a display system is disclosed in JP Publication of Application No. 2001-037302 (JP-A-2001-037302) (Paragraphs 0025 and 0050, FIGS. 10 and 14).

In recent years, it has been desired to display fuel consumption etc. on a display device which generally includes a liquid crystal display, to help operate the work vehicle more economically. However, available space for the display device is quite limited, since the display device is arranged in the instrument panel unit located in front of the operator and having a tachometer, various of indicator lamps, etc. as mentioned above, in order that the display device becomes highly visible during travel. Therefore, it is difficult to secure the display area exclusively for displaying fuel consumption etc. in the display device screen. As a result, in a conventional display device, it is difficult to display such quantity as fuel consumption which serves as an indicator for operating work vehicles more economically.

SUMMARY OF THE INVENTION

An object of the invention is to provide a display system for a work vehicle which is capable of effectively displaying additional information such as fuel consumption used to assist in operating the work vehicle economically.

The above object is fulfilled according to one aspect of the invention as under:—

A display system for a work vehicle comprising:
a display device having an information display area; and
a display control unit for controlling the display device;
a display switching command device which outputs a display switching command for switching a display in the display device;
wherein the display control unit selects and sets, based on an output from the display switching command device, one or more of an operating time display mode for displaying an operating time of an engine, an instantaneous fuel consumption display mode for displaying an instantaneous fuel consumption, an average fuel consumption display mode for displaying an average fuel consumption, and an amount of used fuel display mode for displaying an amount of used fuel, as a display mode for the information display area.

This configuration allows a single information display area, allocated in the screen of the display device, to selectively and alternatively display an operating time of the engine which may be used as an indicator for maintenance purposes such as an oil change, and an instantaneous fuel consumption, average fuel consumption or the amount of used fuel, which may be used as an indicator for operating the work vehicle more economically.

By selectively displaying, on this information display area, one of: the operating time of the engine which the operator is not always required to see, and the instantaneous fuel consumption, the average fuel consumption, and the amount of used fuel which are desirable for the operator to be aware of for operating the work vehicle economically, there is no need to allocate a dedicated display area for each of the instantaneous fuel consumption, average fuel consumption, and the amount of used fuel within a limited screen area of the display device, thus increase in the size of the display device (or its screen) can be avoided.

According to one of the preferred embodiments of the present invention:

The display system further comprises a reset command device which outputs a reset command for the operating time of the engine, and wherein the display control unit resets the operating time of the engine based on the reset command from the reset command device, the operating time display mode includes a total operating time display mode for displaying a total operating time of the engine and an after-reset operating time display mode for displaying the operating time of the engine after a reset, wherein the display control unit switches the display mode of the information display area to a selected one of the total operating time display mode, the after-reset operating time display mode, the instantaneous fuel consumption display mode, the average fuel consumption display mode, and the amount of used fuel display mode, based on a signal from the display switching command device.

In accordance with this embodiment, for example, by resetting the engine operating time by the reset command device when refueling, the operating time of the engine after the refuel may be displayed in the information display area. And, by resetting the engine operating time by the reset command device when starting up the engine, the operating time of the engine after the engine start-up may be displayed in the information display area.

Also, by resetting the engine operating time by the reset command device at the start of work, the operating time of the engine for the work to be done may be displayed in the information display area.

More specifically, by resetting the engine operating time by the reset command device at the start of work, the operating time of the engine after the reset may be used as an indicator for the amount of work to be done or for the work efficiency. Thus, the operating time of the engine after a reset may be easily displayed as an indicator for the amount of work or for work efficiency to assist the operator to see the amount of work and the work efficiency with ease.

In an alternative one of the embodiments of the present invention, the reset command device outputs a reset command for resetting the average fuel consumption display, and the display control unit resets the average fuel consumption display based on the average fuel consumption reset command, and displays an average fuel consumption after the reset in the average fuel consumption display mode.

In yet another of the embodiments, the reset command device outputs a reset command for resetting the amount of used fuel display, and wherein the amount of used fuel display is reset based on the amount of used fuel reset command from the reset command device, and an amount of used fuel after the reset is displayed in the amount of used fuel display mode.

In accordance with these embodiments, by resetting the average fuel consumption and the amount of used fuel by the reset command device when refueling, for example, the average fuel consumption and the amount of used fuel after the refuel may be displayed in the information display area.

Also, by resetting the average fuel consumption and the amount of used fuel by the reset command device at the time of an engine start-up, the average fuel consumption and the amount of used fuel after the engine start-up may be displayed in the information display area.

Also, by resetting the average fuel consumption and the amount of used fuel by the reset command device at the start of work, the average fuel consumption and the amount of used fuel for the work to be done may be displayed in the information display area.

Thus, this construction facilitates learning the desired average fuel consumption and the amount of used fuel. Also, by resetting the average fuel consumption and the amount of used fuel by the reset command device at the start of work, the average fuel consumption and the amount of used fuel displayed in the information display area are displayed as appropriate indicators for an economical operation of the work vehicle for, for example, the work to be done.

In accordance with yet another embodiment, the display switching command device includes a manually operated switch and outputs a generated switch signal to the display control unit.

With this construction, any necessary one of the total operating time of the engine, the operating time of the engine after a reset, instantaneous fuel consumption, average fuel consumption, and the amount of the fuel used may be easily displayed in the information display area.

Further, to facilitate the operation to display additional information, in accordance with another embodiment, the display control unit cyclically sets the display mode of the information display area through: the total operating time display mode, the after-reset operating time display mode, the instantaneous fuel consumption display mode, the average fuel consumption display mode, and the amount of used fuel display mode, based on switch signals sequentially outputted by the switch, in the stated sequence.

It is advantageous in terms of cost and space when a manually operated switch is used not only as the display switching command device but also as the reset command device.

Further, in such an embodiment, a switch signal outputted as a result of a short pressing-down operation of the manually operated switch is used as the display switching command, and a switch signal outputted as a result of a long pressing-down operation of the manually operated switch is used as the reset command.

Other features and advantages of the present invention will be made apparent upon reading the following description of an embodiment with reference to the attached drawings.

DETAILED DESCRIPTION OF THE PREFERRED EMBODIMENTS

An embodiment of a display system for a work vehicle in accordance with the present invention, which system is applied to a tractor as an example of such a work vehicle, will be described hereinafter with reference to the drawings, to describe a mode for carrying out the present invention.

Figure 1:
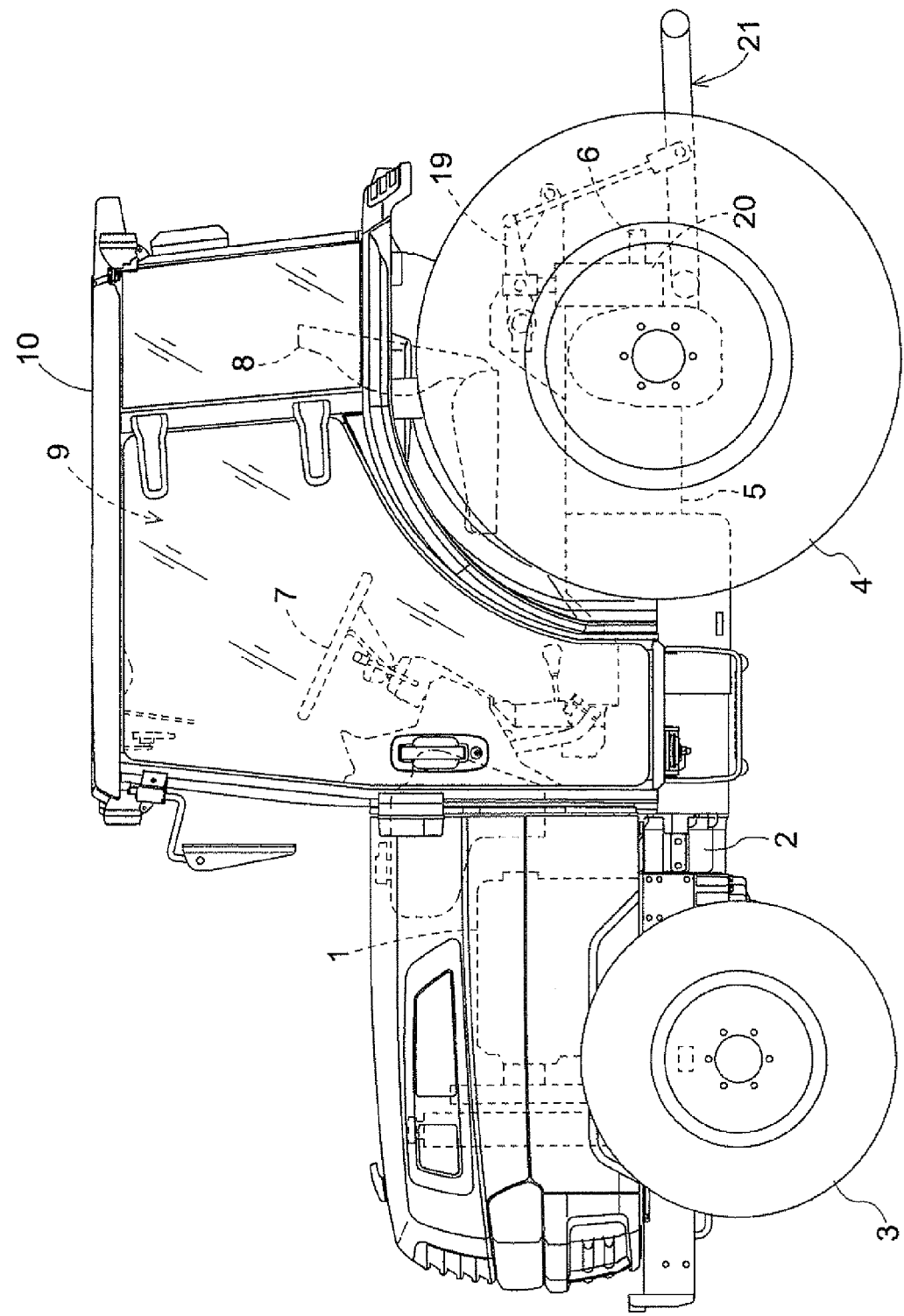
FIG. 1 is an overall side view of a tractor.

As shown in FIG. 1, the tractor supplies rotation power outputted from a water-cooled diesel engine 1 (simply referred to as "engine" hereinafter) mounted at a forward position thereof via an electro-hydraulically controlled main clutch 2 to a travel drive line and an implement drive line. The power supplied to the travel drive line is transmitted to right/left pair of front wheels 3 and right/left pair of rear wheels 4. The power supplied to the implement drive line is transmitted to a PTO axis (power takeoff axis) 6 for power take off provided at a back end portion of a transmission case 5 (referred to as "T/M case" hereinafter) also serving as a vehicle body frame.

While not shown, the travel drive line includes an electro-hydraulically controlled main speed change device which is capable of producing eight speeds or eight gear ratios; an electro-hydraulically controlled auxiliary speed change device which is capable of being switched among the neutral position and two gear ratios including a high speed and a low speed; an electro-hydraulically controlled forward-reverse switching device which enables switching between a forward travel and a reverse travel; an electro-hydraulically controlled front-wheel change speed device which selectively transmits and cuts off power to the right/left front wheels 3 and which selectively doubles rotational speed; a differential gear for the front wheels; a differential gear for the rear wheels, etc.

The implement drive line includes an electro-hydraulically controlled implement clutch which transmits and cuts off power to the PTO axis 6, and an electro-hydraulically controlled implement speed change device which is capable of producing three speeds or gear ratios for the PTO axis 6 and which is capable of switching between a forward rotation and a reverse rotation.

As shown in FIG. 1, a cabin 10 is provided at a rearward position of the tractor for enclosing a driver's compartment 9, and the driver's compartment 9 has a steering wheel 7 for front-wheel steering, and a driver's seat 8, etc.

Figure 2:
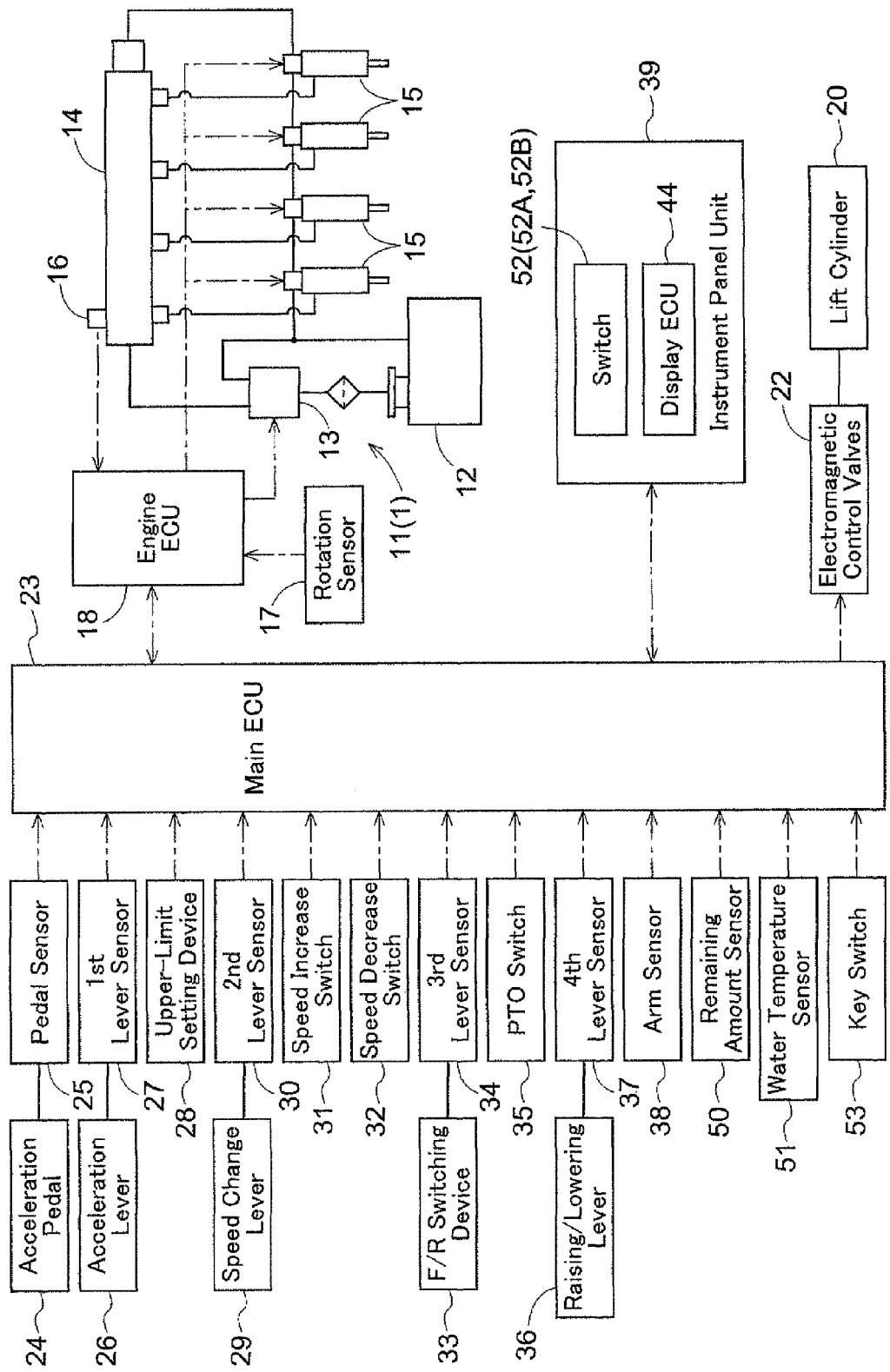
FIG. 2 is a block diagram showing a control system.

With reference to FIG. 2, the engine 1 has a common-rail-type fuel injection device 11 which performs electronic control of the injection quantity and injection timing of fuel. The fuel injection device 11 includes a supply pump 13 which transports fuel stored in a fuel tank 12 under pressure; a common rail 14 which accumulates the transported fuel under pressure; a plurality of injectors 15 which inject fuel accumulated under pressure into combustion chambers (not shown); a pressure sensor 16 which detects the internal pressure of the common rail 14; an electromagnetism pickup type rotation sensor 17 which detects the output rotational speed of the engine 1; and an electronic control unit 18 for the engine (referred to as "engine ECU" hereinafter) which unit 18 controls operations of the supply pump 13, each injector 15, etc. based on outputs from the pressure sensor 16, the rotation sensor 17, etc. The engine ECU 18 includes a microcomputer incorporating a CPU, an EEPROM, etc.

As shown in FIGS. 1 and 2, provided to the rear of the T/M case 5 are right/left pair of lift arms 19, right/left pair of lift cylinders 20 which pivotally actuate the lift arms 19 in a vertical direction, and a linkage mechanism 21 for connecting a work implement. Thereby, various types of work implements (not shown), such as a rotary tilling device and a plough, can be replaceably and vertically movably attached to the tractor.

Each of the right/left lift cylinders 20 comprises a single action type hydraulic cylinder. The right/left lift cylinders 20 can be extended and retracted by controlling the flow of the hydraulic fluid to/from them. The flow of the hydraulic fluid to the right/left lift cylinders 20 is controlled by electromagnetic control valves 22.

While not shown, if a rolling cylinder which enables a rolling actuation of the implement is adopted as the linkage mechanism 21, implements (not shown), such as a rotary tilling device and a pre-transplant tilling device, may be alternatively mounted to allow for rolling movements, as well as vertical movements, of such implements.

Figure 3:
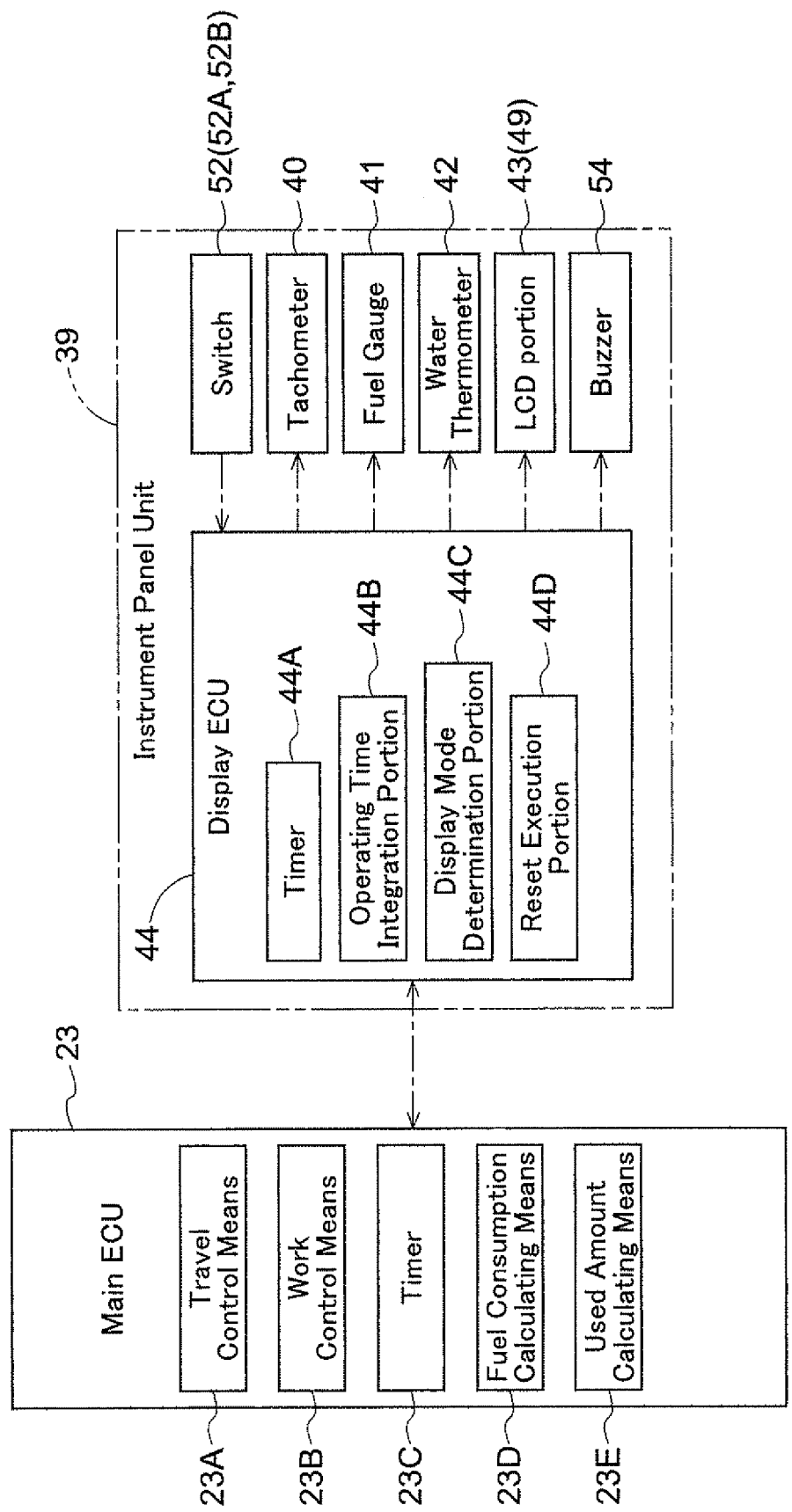
FIG. 3 is a functional block diagram showing a part of the control system in detail.
Figure 4:
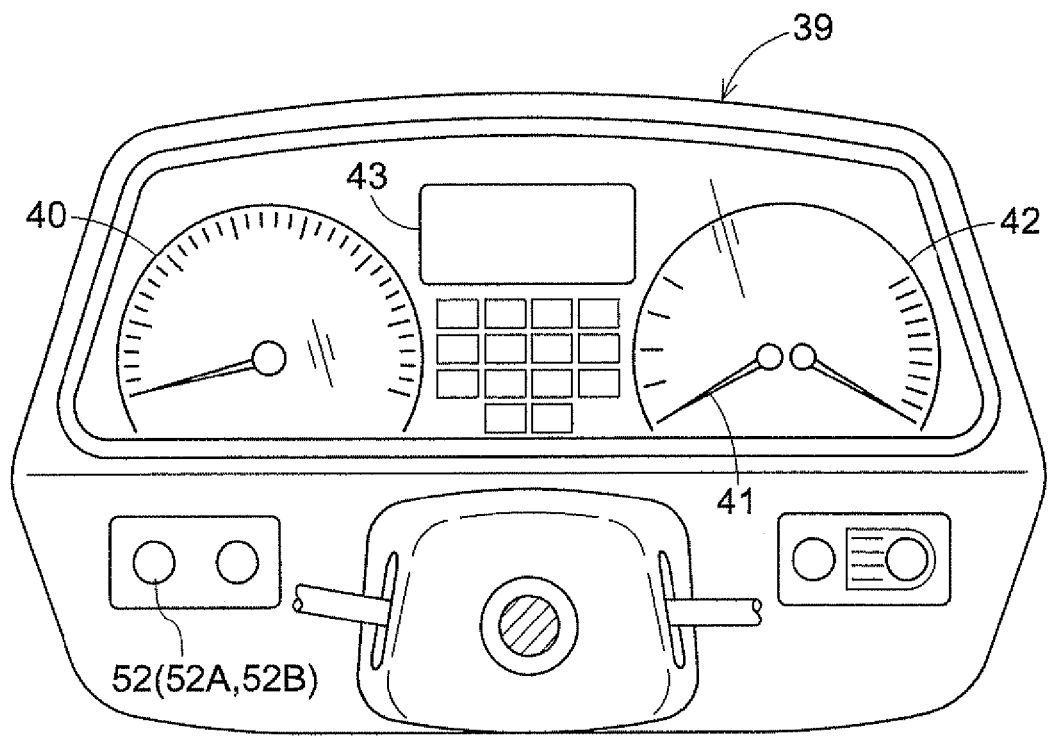
FIG. 4 shows a configuration of a display device.

As shown in FIGS. 2 and 3, the engine ECU 18 is connected to the main electronic-control unit 23 (referred to as "main ECU" hereinafter) mounted on the tractor for a bilateral communication through an intra-vehicle communication such as a CAN communication (controller area network communication). Thereby, the engine ECU 18 is adapted to receive signals from the main ECU 23 such as, an output from a pedal sensor 25 which detects the operation position of a self-returning accelerator pedal 24 provided in the driver's compartment 9, an output from a first lever sensor 27 which detects the operation position of an operated position retaining type accelerator lever 26 provided in the driver's compartment 9, and an output from a rotary dial type upper-limit setting device 28 which sets the upper limit for the engine rotational speed. In addition, the main ECU 23 is adapted to receive signals from the engine ECU 18 such as the amount of fuel injection which the engine ECU 18 commands to each injector 15, and outputs from the rotation sensor 17.

And, the main ECU 23 sets a target rotational speed of the engine 1 based on an output from the pedal sensor 25, an output from the first lever sensor 27, an output from the upper-limit setting device 28, etc.; and controls the engine rotational speed by controlling the operation of the supply pump 13, each injector 15, etc. and adjusting the amount of fuel injection so as to bring the output from the rotation sensor 17 into agreement with the target rotational speed.

The main ECU 23 includes a microcomputer equipped with a CPU, an EEPROM, etc. The main ECU 23 includes control programs which function as travel control means 23A, and work control means 23B, etc.

The travel control means 23A performs an auxiliary speed change control for controlling the operation of the main clutch 2 and the auxiliary speed change device, a main speed change control for controlling the operation of the main speed change device, a forward-reverse switching control for controlling the operation of the forward-reverse switching device, etc.

In the auxiliary speed change control, operations of the main clutch 2 and the auxiliary speed change device are controlled to obtain the operational state of the main clutch 2 and the operational state of the auxiliary speed change device which correspond to the manipulated position of a speed change lever 29, based on an output from a second lever sensor 30 which detects the manipulated position of the speed change lever 29 provided in the driver's compartment 9.

In the main speed change control, the operation of the main speed change device is controlled based on operations of a speed increase switch 31 and a speed decrease switch 32 provided to the speed change lever 29 so that the operational state of the main speed change device corresponding to the number of times the speed increase switch 31 and the speed decrease switch 32 are operated is obtained.

In the forward-reverse switching control, the operation of the forward-reverse switching device is controlled to obtain the operational state of the forward-reverse switching device which corresponds to the manipulated position of the forward-reverse switching lever 33 based on the output from the third lever sensor 34 which detects the manipulated position of the forward-reverse switching lever 33 provided in the driver's compartment 9.

The work control means 23B performs a PTO speed change control which controls the operations of the implement clutch and the implement speed change device; a raising and lowering control which controls the operations of the lift cylinders 20 to raise and lower the implement, etc.

In the PTO speed change control, the operations of the implement clutch and the implement speed change device are controlled to obtain operational states of the implement clutch and the implement speed change device which states correspond to the manipulated position of a rotary dial type PTO switch 35, based on an output from the PTO switch 35 provided in the driver's compartment 9.

In the raising and lowering control, a position control for controlling the operation of the lift cylinder 20 is performed, based on the output from a fourth lever sensor 37 which detects the manipulated position of a raising and lowering lever 36 provided in the driver's compartment 9 and on the output from an arm sensor 38 which detects the vertical pivot angle of the lift arms 19, so as to obtain the vertical pivot angle of the lift arms 19 (height of the implement) corresponding to the manipulated position of the raising and lowering lever 36.

As shown in FIGS. 2-5, an instrument panel unit 39 is provided forwardly and downwardly of the steering wheel 7 in the driver's compartment 9. The instrument panel unit 39 includes a tachometer 40 which displays the engine rotational speed, a fuel gauge 41 which displays the amount of remaining fuel, a water thermometer 42 which displays the temperature of the engine cooling water, a liquid crystal display portion (an example of a display device) 43 which displays the speed change position or gear ratio each of the main speed change device and the auxiliary speed change device, and a display electronic-control unit (simply referred to as "display ECU" hereinafter) 44 acting as a display control unit which controls these operations, etc.

The liquid crystal display portion 43 has a main speed change position display area 45 of the segment display type which provides or displays a character or alphanumerical representation of the speed change position or the gear ratio of the main speed change device; an auxiliary speed change position display area 46 of the segment display type which provides or displays a character or alphanumerical representation of the speed change position or the gear ratio of the auxiliary speed change device; a forward and reverse display area 47 of the segment display type which provides or displays a character or alphanumerical representation of the state of the forward-reverse switching device; a height display area 48 of the segment display type which provides or displays a character or alphanumerical representation of the vertical pivot angle of the lift arm 19 as the height of the implement; and an information display area 49 of the segment display type which provides or displays a character or alphanumerical representation of various kinds of information including the total operating time of the engine 1.

As shown in FIG. 3, the display ECU 44 is connected to the engine ECU 18 and the main ECU 23 for the bilateral communication through an intra-vehicle communication such as the CAN communication. This allows the display ECU 44 to receive various data or signals from the engine ECU 18 and the main ECU 23 such as: an output from the rotation sensor 17; an output from each lever sensor 26, 30, 34 or 37; an output from the speed increase switch 31; an output from the speed decrease switch 32, an output from the arm sensor 38; an output from a remaining fuel sensor 50 which detects the amount of remaining fuel; and an output from a water temperature sensor 51 which detects the temperature of the cooling water.

The display ECU 44 changes: the engine rotational speed displayed on the tachometer 40 based on an output from the rotation sensor 17; the amount of remaining fuel displayed on the fuel gauge 41 based on an output from the remaining fuel sensor 50; the temperature of the cooling water displayed on the water thermometer 42 based on an output from the water temperature sensor 51; the speed change position of the main speed change device displayed in the main speed change position display area 45 based on an output from the speed increase switch 31 and the speed decrease switch 32; the speed change position of the auxiliary speed change device displayed in the auxiliary speed change position display area 46 based on an output from the second lever sensor 30; the state of the forward-reverse switching device displayed in the forward and reverse display area 47 based on an output from the third lever sensor 34; and the vertical pivot angle of the lift arms 19 displayed in the height display area 48 based on an output of the arm sensor 38.

The display ECU 44 is configured to perform functions of: a timer 44A which measures the operating time (or time worked) of the engine 1; an operating time integration portion 44B which adds up or integrates the operating time of the engine 1; a display mode determination portion 44C; a reset execution portion 44D, etc.

The timer 44A measures a period of operating time of the engine 1 when the operation of the engine 1 is being detected based on the output of the rotation sensor 17.

The operating time integration portion 44B performs the total operating time addition operation which integrates or adds up the total operating time of the engine 1 based on the output of the timer 44A. In addition, a manual operation switch (simply referred to as "switch" hereinafter) 52 is provided leftward and downwardly of the instrument panel unit 39. In the present embodiment, the switch 52 functions as a display switching command device 52A which outputs a display switching command, and also as a reset command device 52B which outputs a reset command. When a switch signal acting as an operating time reset command outputted from the switch 52 is received, the operating time integration portion 44B performs the after-reset operating time addition operation which integrates the operating time of the engine 1 after the reset, based on the output from the timer 44A after the reset, as well as the total operating time addition operation mentioned above. In addition, if the operating time of the engine 1 after a reset is being integrated before an operating time reset command is received, the operating time integration portion 44B resets the operating time of the engine 1 integrated after the reset and until receipt of the operating time reset command.

The display mode determination portion 44C determines the display mode to be actually executed among various display modes described later, based on a switch signal outputted from the switch 52. The reset execution portion 44D determines the function or operation to be reset based on a switch signal outputted from the switch 52, and resets this function or operation.

As shown in FIG. 3, the main ECU 23 includes functions of the timer 23C which measures the operating time of the engine 1; a fuel consumption calculating means 23D to calculate fuel consumption; used amount calculating means 23E which calculates the amount of the used fuel; etc.

The timer 23C detects if the engine 1 is operating or not based on an output from the rotation sensor 17, and measures the operating time of the engine 1 when the engine rotational speed is greater than a set rotational speed (e.g. 100 RPM).

The fuel consumption calculating means 23D substitutes, into a predetermined formula for calculating an instantaneous fuel consumption, the amount of injected fuel outputted by the engine ECU 18, an output from the rotation sensor 17, various numerical values stored in the EEPROM for calculating instantaneous fuel consumption, and performs an instantaneous fuel consumption calculation by performing a low-pass filtering on the derived result using a predetermined time constant (such as 200 ms). In addition, the fuel consumption calculating means 23D performs an average fuel consumption calculation operation which computes the average fuel consumption (fuel consumption per unit time) by substituting, into a predetermined formula, instantaneous fuel consumption derived in the instantaneous fuel consumption calculation operation, an output form the timer 23C, various numerical values stored in the EEPROM for calculating the average fuel consumption, etc. In this average fuel consumption calculation operation, when an average fuel consumption reset command is received from the switch 52, the fuel consumption calculating means 23D resets the average fuel consumption calculated until the average fuel consumption reset command is received. And, the fuel consumption calculating means 23D calculates the average fuel consumption after the reset by substituting into a predetermined formula for calculating the average fuel consumption, the instantaneous fuel consumption derived in the instantaneous fuel consumption calculation operation after the reset, an output form the timer 23C after the reset, and various numerical values stored in the EEPROM for calculating the average fuel consumption, etc.

The used amount calculating means 23E performs a used amount calculation operation which computes the amount of used fuel by substituting, into a predetermined formula for calculating the amount of used fuel, the instantaneous fuel consumption output by the fuel consumption calculating means 23D, an output form the timer 23C, various numerical values stored in the EEPROM for calculating the amount of used fuel, etc. In this used amount calculation operation, if the used amount calculating means 23E receives an amount of used fuel reset command from the switch 52, the used amount calculating means 23E resets the amount of used fuel calculated until the amount of consumed fuel reset command is received. And, the used amount calculating means 23E calculates the amount of used fuel after the reset by substituting, into a predetermined formula for calculating the amount of used fuel, the instantaneous fuel consumption derived in the instantaneous fuel consumption calculation operation after the reset, an output form the timer 23C after the reset, various numerical values stored in the EEPROM for calculating the amount of used fuel, etc.

Thus, the total operating time of the engine 1, operating time of the engine 1 after a reset, instantaneous fuel consumption, average fuel consumption, average fuel consumption after a reset, the amount of used fuel, and the amount of used fuel after a reset, each obtained by respective one of the above-mentioned operations, can be displayed on the information display area 49 through the control of display ECU 44.

Figure 10A:
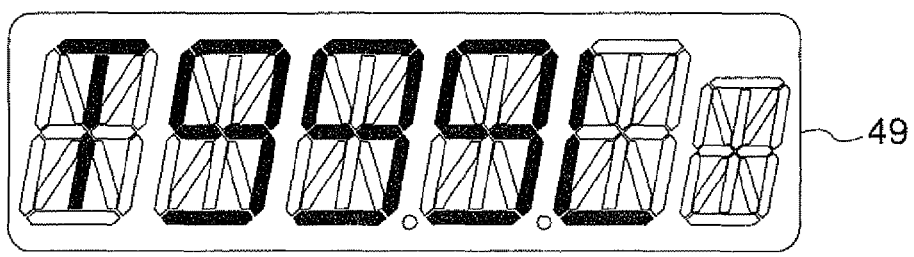
FIG. 10A shows an amount of used fuel display mode on the information display area.
Figure 10B:
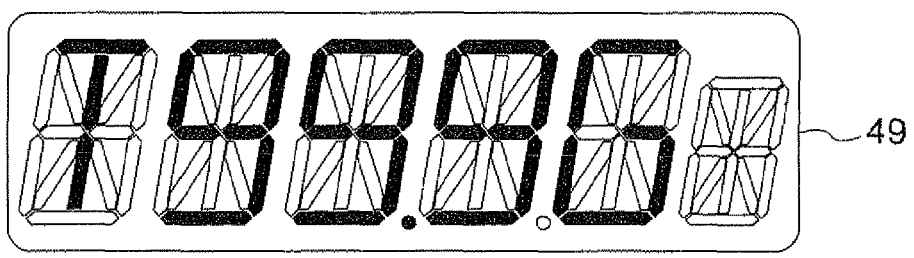
FIG. 10B shows the amount of used fuel display mode on the information display area.

As shown in FIG. 6 through FIGS. 10A and 10B, the display ECU 44 is started by switching on a key switch 53 provided adjacent to the instrument panel unit 39. After a start-up, the display ECU 44 reads various information, including the total operating time of the engine 1 stored in EEPROM, and displays the total operating time of the engine 1 on the information display area 49 (see FIG. 6). In the total operating time display mode showing the total operating time of the engine 1, when a display change command is received from the switch 52, the display mode of the information display area 49 is switched from the total operating time display mode to the after-reset operating time display mode which displays the operating time of the engine 1 after a reset (see FIG. 7). In this after-reset operating time display mode, when a display change command is received from the switch 52, the display mode of the information display area 49 is switched from the after-reset operating time display mode to the instantaneous fuel consumption display mode which displays the instantaneous fuel consumption (see FIGS. 8A and 8B). In this instantaneous fuel consumption display mode, if the display change command is received from the switch 52, the display mode of the information display area 49 is switched from the instantaneous fuel consumption display mode to the average fuel consumption display mode which displays the average fuel consumption or the average fuel consumption after a reset (see FIGS. 9A and 9B). In this average fuel consumption display mode, if the display change command is received from the switch 52, the display mode of the information display area 49 is switched from the average fuel consumption display mode to the amount of used fuel display mode which displays the amount of used fuel or the amount of used fuel after a reset (FIGS. 10A and 10B). In this amount of used fuel display mode, if the display change command is received from the switch 52, the display mode of the information display area 49 is switched from the amount of used fuel display mode to the total operating time display mode (see FIG. 6).

That is, based on the display change command outputted from the switch 52, the display ECU 44 switches the display mode of the information display area 49 through the total operating time display mode, the after-reset operating time display mode, the instantaneous fuel consumption display mode, the average fuel consumption display mode and the amount of used fuel display mode in turns in the stated sequence.

The switch 52 is a momentary switch, and when the switch 52 is pressed down for a short period which is less than a predetermined period (for example, less than 2 seconds) in each of above-mentioned display modes, the display ECU 44 receives the ON signal of duration less than the predetermined time outputted from the switch 52, and interprets it as a display switching command. When the switch 52 is pressed down for a longer period which is longer than a predetermined period (for example, longer than or equal to 2 seconds) in the after-reset operating time display mode, the display ECU 44 receives the ON signal of duration longer than the predetermined time outputted from the switch 52, and interprets it as an operating time reset command. When the switch 52 is pressed down for a longer period which is longer than a predetermined period (for example, longer than or equal to 2 seconds) in the average fuel consumption display mode, the display ECU 44 receives the ON signal of duration longer than the predetermined time outputted from the switch 52, interprets it as an average fuel consumption reset command, and outputs it to the main ECU 23. When the switch 52 is pressed down for a longer period which is longer than a predetermined period (for example, longer than or equal to 2 seconds) in the amount of used fuel display mode, the display ECU 44 receives the ON signal of duration longer than the predetermined time outputted from the switch 52, interprets it as an amount of used fuel reset command, and outputs it to the main ECU 23. Thereby, the switch 52 functions as both a display switching command device 52A and a reset command device 52B.

With the configuration described above, by pressing down the switch 52 for a short period of time, one information display area 49 provided to the liquid crystal display portion 43 may be switched easily among: the state of functioning as an hour meter (see FIG. 6) which displays the total operating time of the engine 1 to act as an indicator for maintenance purposes such as an oil change; the state of functioning as a trip meter (see FIG. 7) which displays the operating time of the engine 1 after a reset to act as an indicator for amount of work done, working efficiency etc.; the state of functioning as a fuel consumption meter (see FIGS. 8A, 8B, 9A and 9B) which displays instantaneous fuel consumption and average fuel consumption to act as an indicator for operating the tractor more economically; and the state of functioning as a device for measuring the amount of used fuel (see FIGS. 10A and 10B) which displays the amount of used fuel.

Thus, the information display area 49 can be switched between the state of functioning as the hour meter or the trip meter for displaying the total operating time of the engine 1 or the operating time of the engine 1 after a reset, which the operator does not always need to look at; and the state of functioning as the fuel consumption meter or the fuel consumption meter for displaying the instantaneous fuel consumption, average fuel consumption or amount of used fuel, which is desirable for the operator to always be aware of to operate the work vehicles more economically. Thereby, it is not necessary to provide a meter dedicated to display instantaneous fuel consumption, average fuel consumption, or amount of used fuel on the instrument panel unit 39, or to provide the liquid crystal display portion 43 with a display area dedicated to display instantaneous fuel consumption, average fuel consumption or amount of used fuel. This avoids an increase in size of the instrument panel unit 39 or the liquid crystal display portion 43.

That is, instantaneous fuel consumption, average fuel consumption or amount of used fuel can be displayed to use it as an indicator for operating the tractor more economically without causing an increase in size of the instrument panel unit 39 or the liquid crystal display portion 43, thus promoting more economical operations.

And, when starting the work using the tractor, the operating time of the engine 1, the average fuel consumption, and amount of used fuel in the work to be done at the moment can be easily grasped by resetting the operating time of the engine 1, average fuel consumption, and amount of used fuel.

That is, the average fuel consumption and amount of used fuel can be used as more suitable indicators for operating the tractor more economically in the work to be done at the moment, thus effectively promoting more economical operation of the tractor suitable for a given environment in which the tractor is used.

And, by arranging the switch 52 to function both as the display switching command device 52A and as the reset command device 52B, space can be saved and cost reduction can be expected as compared with the case where the display switching command device 52A and the reset command device 52B are configured as respective dedicated switches.

In each of the after-reset operating time display mode, the average fuel consumption display mode and the amount of used fuel display mode, when the duration of the pressing-down operation of the switch 52 reaches the predetermined amount of time, the display ECU 44 notifies the operator, by activating a buzzer 54 provided to the instrument panel unit 39 once, of the resetting of the information displayed on the information display area 49 at that time—the operating time of the engine 1, average fuel consumption, or the amount of the fuel used.

In this manner, the operator is made aware of whether a reset operation, based on a long-duration press-down operation of the switch 52, was performed.

As shown in FIGS. 2, 8A and 8B through 10A and 10B, when the switch 52 is pressed down for a longer period which is longer than a predetermined period (for example, longer than or equal to 2 seconds) in the instantaneous fuel consumption display mode, the display ECU 44 receives the ON signal of duration longer than the predetermined time outputted from the switch 52 and interprets it as a unit change command. Based on this unit change command, the unit of measure used in the information display area 49 is switched between a liter display (see FIGS. 8A, 9A and 10A) and a gallon display (see FIGS. 8B, 9B and 10B), and performs the unit conversion corresponding to the displayed unit at that time.

In this manner, switching of the displayed unit between the liter display and the gallon display at the time of displaying instantaneous fuel consumption, average fuel consumption or the amount of the fuel used in the information display area 49 may be performed easily, and the appropriate value corresponding to the displayed unit can be displayed on the information display area 49.

In the instantaneous fuel consumption display mode, when a pressing-down operation of the switch 52 reaches the predetermined amount of time, display ECU 44 operates the buzzer 54 once and reports switching of the displayed unit in the information display area 49 to the operator based on the long-duration pressing-down operation of the switch 52 at that time.

In this manner, the operator is made aware of whether a displayed unit in the information display area 49 was changed based on a long-duration pressing-down operation of the switch 52.

As shown in FIGS. 6-9, the display ECU 44 displays 'h' as a displayed unit in the total operating time display mode and the after-reset operating time display mode (see FIGS. 6 and 7), displays 'Lh' or 'Gh' which are simplified forms of L/h or G/h as a displayed unit in the instantaneous fuel consumption display mode and the average fuel consumption display mode (see FIGS. 8A, 8B, 9A and 9B), and displays 'L' or 'G' as a displayed unit in the amount of used fuel display mode (see FIGS. 10A and 10B). In addition, in the average fuel consumption display mode, a symbol 'A' is attached before the average fuel consumption as an identifying mark (see FIGS. 9A and 9B), and in the amount of used fuel display mode, 'T' is attached before the amount of the fuel used as an identifying mark (FIGS. 10A and 10B). Accordingly, the operator can easily identify the value currently displayed in the information display area 49 as any one of the total operating time of the engine 1, the operating time of the engine 1 after a reset, instantaneous fuel consumption, average fuel consumption, and the amount of the fuel used.

Figure 5:
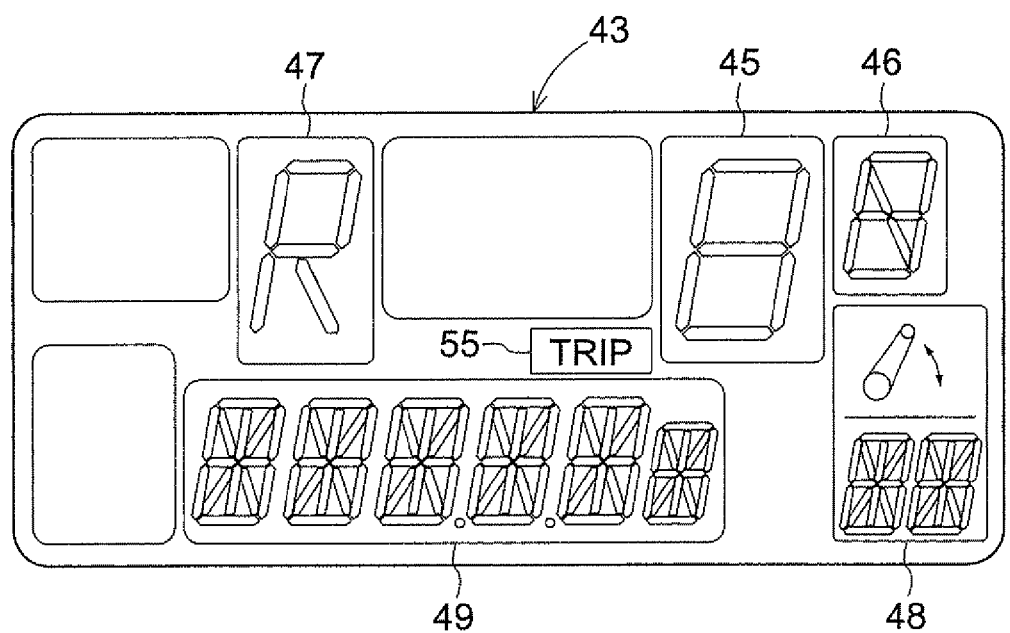
FIG. 5 shows the configuration of a principal portion of the display device.
Figure 6:
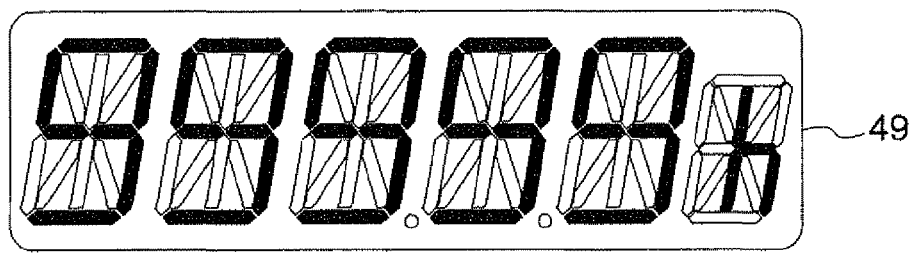
FIG. 6 is a front view showing a total operating time display mode on an information display area.
Figure 7:
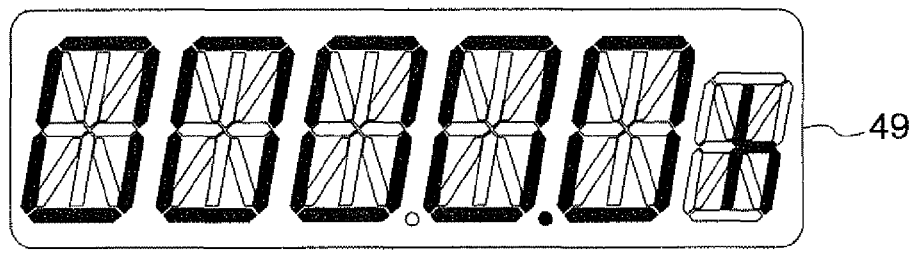
FIG. 7 shows an after-reset operating time display mode on the information display area.
Figure 8A:
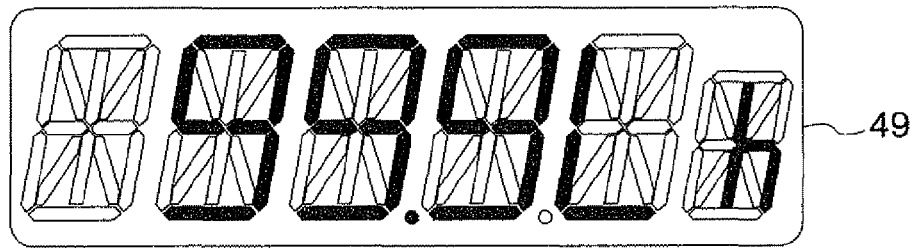
FIG. 8A shows an instantaneous fuel consumption display mode on the information display area.
Figure 8B:
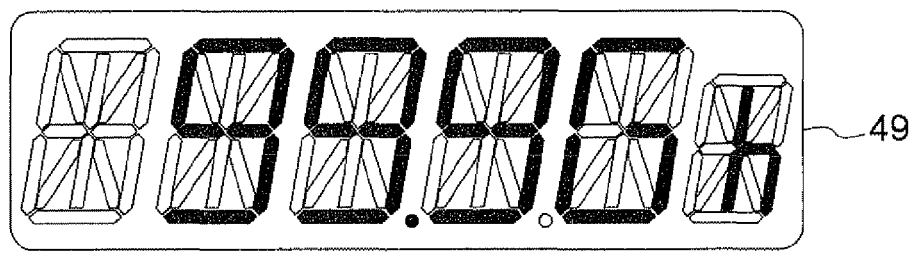
FIG. 8B shows the instantaneous fuel consumption display mode on the information display area.
Figure 9A:
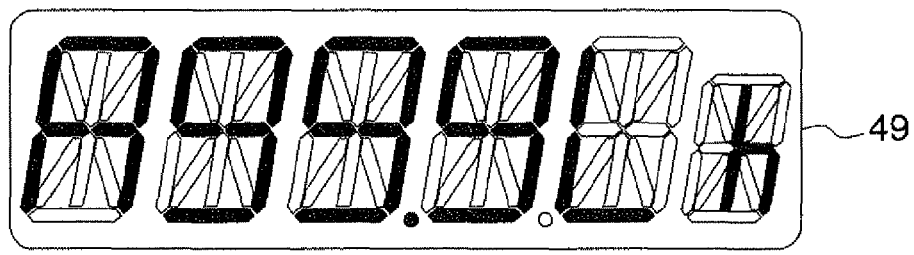
FIG. 9A shows an average fuel consumption display mode on the information display area.
Figure 9B:
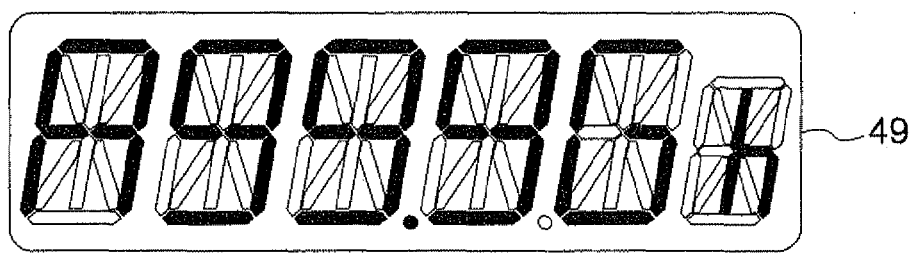
FIG. 9B shows the average fuel consumption display mode on the information display area.

As shown in FIG. 5, an operating time discrimination area 55 is defined in the liquid crystal display portion 43 for identifying the display mode of the information display area 49 as either the total operating time display mode or the after-reset operating time display mode. The operating time discrimination area 55 is configured to display 'TRIP' corresponding to the after-reset operating time by the control operation of the display ECU 44 only when the display mode of the information display area 49 is the after-reset operating time display mode.

Although illustration is omitted, in the instantaneous fuel consumption display mode, the display ECU 44 illuminates the value of instantaneous fuel consumption when the instantaneous fuel consumption is less than or equal to the average fuel consumption, and flashes on and off or blinks the value of instantaneous fuel consumption when the instantaneous fuel consumption exceeds the average fuel consumption. In the average fuel consumption display mode, the display ECU 44 illuminates the value of average fuel consumption when the instantaneous fuel consumption is less than or equal to the average fuel consumption, and flashes on and off or blinks the value of average fuel consumption when the instantaneous fuel consumption exceeds the average fuel consumption.

Accordingly, when the instantaneous fuel consumption or average fuel consumption currently displayed by the information display area 49 is blinking (instantaneous fuel consumption exceeds average fuel consumption), fuel efficiency can be improved by changing the speed change position of the engine rotational speed or the main speed change device in such a way that the instantaneous fuel consumption or average fuel consumption is constantly illuminated (i.e. instantaneous fuel consumption not exceeding average fuel consumption).

That is, in either the instantaneous fuel consumption display mode or the average fuel consumption display mode, the operator may be easily made aware of whether the instantaneous fuel consumption has exceeded average fuel consumption, and thus more economical operation of the tractor may be encouraged to the operator.

Figure 11A:
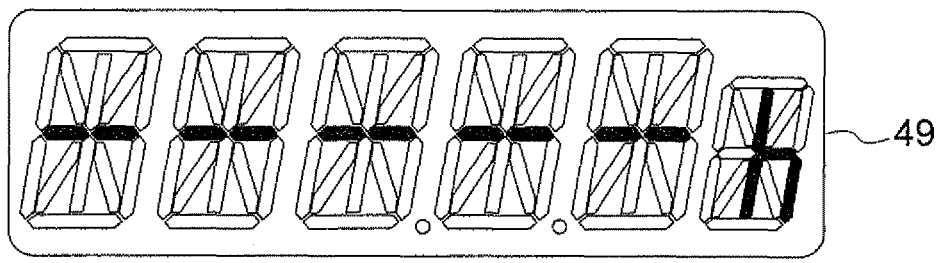
FIG. 11A shows a bar display mode on the information display area.
Figure 11B:
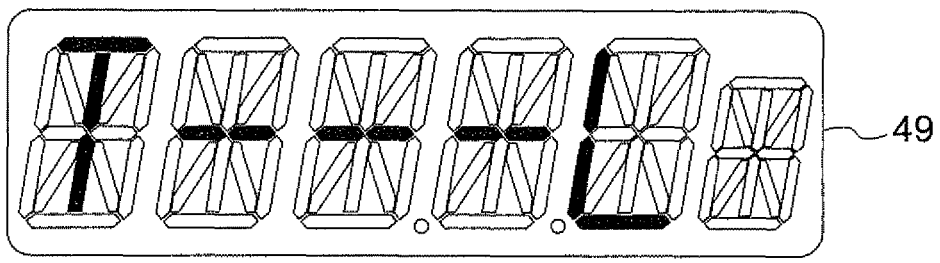
FIG. 11B shows the bar display mode on the information display area.
Figure 11C:
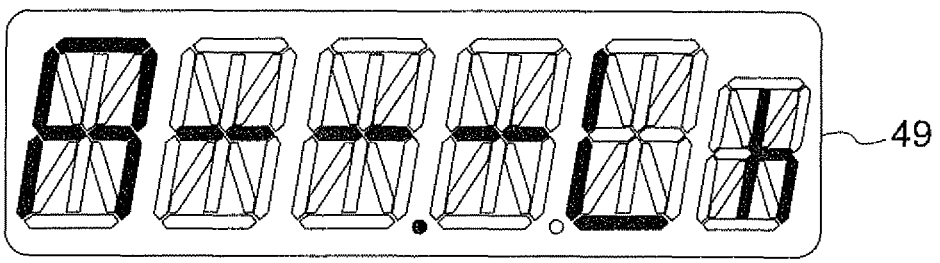
FIG. 11C shows the bar display mode on the information display area.

As shown in FIGS. 11A, 11B and 11C, when the calculated operating time of the engine 1 exceeds the display limit in the after-reset operating time display mode, the display ECU 44 indicates the engine operating time in the after-reset operating time display mode by displaying bars (or bar display: see FIG. 11A). And, when the calculated amount of used fuel exceeds the display limit in the amount of used fuel display mode, the display ECU 44 indicates the amount of the fuel used in amount of used fuel display mode by the bar display (see FIG. 11B).

Further, when the operating time of the engine 1 to be calculated exceeds the processing capability of the display ECU 44, the display ECU 44 indicates the engine operating time in the after-reset operating time display mode by a bar display (see FIG. 11A) and the average fuel consumption in the average fuel consumption display mode by the bar display (see FIG. 11C). Further, when the amount of used fuel to be calculated exceeds the processing capability of the main ECU 23, the display ECU 44 indicates the amount of used fuel in the amount of used fuel display mode by a bar display (see FIG. 11B) and the average fuel consumption in the average fuel consumption display mode by the bar display (see FIG. 11C).

Accordingly, when the calculated operating time of the engine 1 or the amount of used fuel exceeds the display limit, the operator is encouraged to reset the operating time of the engine 1, the amount of used fuel and average fuel consumption by indicating the operating time of the engine 1 or the amount of used fuel by bars.

Further, when the operating time of the engine 1 or the amount of used fuel to be calculated exceeds the capacity of the display ECU 44 or main ECU 23, by indicating the operating time of the engine 1 or amount of used fuel as well as the average fuel consumption by bars, incorrect average fuel consumption is prevented from being displayed in the information display area 49 and the operator is encouraged to reset the operating time of the engine 1, the amount of used fuel and average fuel consumption.

When the calculated operating time of the engine 1 or the amount of used fuel exceeds the display limit, or when the operating time of the engine 1 or the amount of used fuel to be calculated exceeds the processing capacity of the display ECU 44 or the main ECU 23, the display ECU 44 or the main ECU 23 automatically resets the operating time of the engine 1, amount of used fuel and average fuel consumption computed thus far, to prevent incorrect average fuel consumption from being displayed in the information display area 49. In this configuration, alarm means, such as a buzzer and a lamp, may be provided for notifying the operator of the automatic reset. Further, selection means, such as a selection switch, may be provided for allowing selection of whether to perform the automatic reset.

As shown in FIGS. 2 and 3, when the main ECU 23 and display ECU 44 shut down based on an OFF operation of the key switch 53, the main ECU 23 and the display ECU 44 perform the storing operation where they store into the EEPROM the total operating time of the engine, the operating time of the engine 1 after a reset, average fuel consumption or the average fuel consumption after a reset, and amount of used fuel, or the amount of the fuel used after a reset, computed up to that point.

In addition, when an engine stall is detected based on the output of the rotation sensor 17, (for example, when the engine rotational speed becomes greater than or equal to a first predetermined rotational speed (for example, 300 rpm), and then falls below to a second predetermined rotational speed (for example, 100 rpm)), the main ECU 23 and the display ECU 44 again perform the storing operation where they store into the EEPROM the total operating time of the engine, the operating time of the engine 1 after a reset, average fuel consumption or the average fuel consumption after a reset, and amount of used fuel, or the amount of the fuel used after a reset, computed up to that point.

Accordingly, even when the CPUs of main ECU 23 and display ECU 44 or the like are reset by re-starting the engine 1 by an operation of the key switch 53 without performing an OFF operation of the key switch 53, after an engine stall, the total operating time of the engine, the operating time of the engine 1 after a reset, average fuel consumption or the average fuel consumption after a reset, and amount of used fuel, or the amount of the fuel used after a reset, computed up to the engine stall, can be stored in the EEPROM and can be read from the EEPROM on re-starting of the engine 1.

Here, the detection conditions for an engine stall may be changed.

Alternative Embodiments

[1] The work vehicle may be alternatively e.g. an agricultural work vehicle such as a rice planting machine and a combine-harvester, or a construction work vehicle such as a backhoe, a wheeled loader.

[2] The implement provided to the work vehicles may be a front loader, a mower, a groove digging device, a ridge coating device, a sowing device, a fertilization device, a chemical spray device, etc.

[3] The engine 1 may be an electronic controlled distribution pump diesel engine, an electronic controlled gasoline engine, etc.

[4] The display control unit (display ECU) 44 and the main ECU 23 may be integrated into one unit. Alternatively, the display control unit 44 may include the fuel consumption calculating means 23D and the consumed amount calculating means 23E which are provided to the main ECU 23 in the foregoing embodiment.

[5] Various changes are possible in the methods to calculate instantaneous fuel consumption, average fuel consumption and/or amount of used fuel. The fuel consumption calculating means 23D may substitute into a predetermined formula for calculating the average fuel consumption, the amount of injected fuel outputted by the engine ECU 18, the output from the rotation sensor 17, the output from the timer 23C, and various numerical values stored in the EEPROM for calculating the average fuel consumption. Further, average fuel consumption may be computed by substituting, into the formula for average fuel consumption calculation, the output from the remaining fuel sensor 50 which detects the amount of remaining fuel, the output from timer 23C, various numerical values for average fuel consumption calculation stored in the EEPROM, etc. Further, the consumed amount calculating means 23E may compute the amount of used fuel by substituting the amount of fuel injection outputted from the engine ECU 18 into a formula for calculating the amount of the used fuel. Moreover, amount of used fuel may be computed by substituting the output from the remaining fuel sensor 50 etc. into a formula for calculating the amount of the used fuel.

[6] As average fuel consumption, the operating time of the engine per unit volume of fuel, fuel consumption per unit distance, distance covered per unit volume of fuel, etc. may be displayed.

[7] The display switching command device 52A may include the switch 52 and based on the output of the switch 52, the display control unit 44 may cycle the display mode of the information display area 49 through in the following sequence: the total operating time display mode, the after-reset operating time display mode, amount of used fuel display mode, the instantaneous fuel consumption display mode, and the average fuel consumption display mode.

[8] The display switching command device 52A may include the timer 44A and based on the output of the timer 44A, the display control unit 44 may change the display after every set period of time and cycle the display mode of the information display area 49 through in the following sequence: the total operating time display mode, the after-reset operating time display mode, the instantaneous fuel consumption display mode, the average fuel consumption display mode, and amount of used fuel display mode.

[9] The display switching command device 52A may include the switch 52 and timer 44A, and the display control unit 44 may switch the display mode of the information display area 49 between the total operating time display mode and the after-reset operating time display mode based on the output of the switch 52. And, when the mode is switched to the after-reset operating time display mode, based on the output of the timer 44A, the display mode of the information display area 49 may be changed after every set period of time and be cycled through in the following sequence: the after-reset operating time display mode, the instantaneous fuel consumption display mode, the average fuel consumption display mode, and amount of used fuel display mode.

[10] The display switching command device 52A may include the switch 52 and the timer 44A, and the display control unit 44 may switch the display mode of the information display area 49 between the operating time display mode and the fuel information display mode based on the output of the switch 52. And, when the display mode is switched to the operating time display mode, the display mode of the information display area 49 may be switched between the total operating time display mode and the after-reset operating time display mode after every set period based on the output of the timer 44A. And, when the display mode is switched to the fuel information display mode, based on the output of the timer 44A, after every set period, the display mode of the information display area 49 may be changed and cycled through in the following sequence: the instantaneous fuel consumption display mode, the average fuel consumption display mode, and amount of used fuel display mode.

[11] The display switching command device 52A may include the switch 52 and timer 44A, and the display control unit 44 switches the display mode of the information display area 49 among the total operating time display mode, the after-reset operating time display mode, and the fuel information display mode based on the output of the switch 52. And, when the display is switched to the fuel information display mode, based on the output of the timer 44A, the display mode of the information display area 49 may be changed after every set period and cycled through in the following sequence: the instantaneous fuel consumption display mode, the average fuel consumption display mode, and amount of used fuel display mode.

[12] The display switching command device 52A may include the timer 44A and work state detection means which detects whether the work vehicle is working or not, and the display control unit 44 may switch the display mode of the information display area 49 based on the outputs from the work state detection means and the timer 44A.

Although various configurations may be considered as specific display change configurations, for example, when the display control unit 44 detects that the work vehicle is not in a work state based on the output of the work state detection means, it may switch the display mode of the information display area 49 between the total operating time display mode and the after-reset operating time display mode after every set period based on the output of the timer 44A, and when it is detected, based on the output of the work state detection means, that the work vehicle is in a work state, the display mode of the information display area 49 may be changed after every set period based on the output of the timer 44A, and cycled through in the following sequence: the instantaneous fuel consumption display mode, the average fuel consumption display mode, and amount of used fuel display mode.

The work state detection means may include a PTO switch 35, a rotation sensor which detects rotation of the PTO axis 6, a clutch sensor which detects engagement and disengagement of the implement clutch, a fourth lever sensor 37 which detects the operation position of the raising-and-lowering lever 36, and the arm sensor 38 which detects the vertical pivot angle of the lift arm 19, and the main ECU 23 which receives the outputs from each of those sensors.

[13] The display switching command device 52A may include the switch 52 and work state detection means which detects whether the work vehicle is working, and the display control unit 44 may switch the display mode of the information display area 49 based on the outputs from the work state detection means and the switch 52.

Although various configurations may be considered as specific display change configurations, for example, when the display control unit 44 detects that the work vehicle is not in a work state based on the output of the work state detection means, it may change the display mode of the information display area 49 based on the output from the switch 52 and cycle through: the total operating time display mode, the after-reset operating time display mode, the instantaneous fuel consumption display mode, the average fuel consumption display mode, and the amount of used fuel display mode, and when it is detected, based on the output of the work state detection means, that the work vehicle is in a work state, the display mode of the information display area 49 may be changed based on the output from the switch 52, and cycled through in the following sequence: the instantaneous fuel consumption display mode, the average fuel consumption display mode, and amount of used fuel display mode in the stated sequence.

The work state detection means may include a PTO switch 35, a rotation sensor which detects rotation of the PTO axis 6, a clutch sensor which detects engagement and disengagement of the implement clutch, a fourth lever sensor 37 which detects the operation position of the raising-and-lowering lever 36, and the arm sensor 38 which detects the vertical pivot angle of the lift arm 19, and the main ECU 23 which receives the outputs from each of those sensors.

[14] The display switching command device 52A may include the switch 52, the timer 44A and work state detection means which detects whether the work vehicle is working, and the display control unit 44 may switch the display mode of the information display area 49 based on the outputs from the work state detection means, the switch 52 and the timer 44A.

Although various configurations may be considered as specific display change configurations, for example, when the display control unit 44 detects that the work vehicle is not in a work state based on the output of the work state detection means, it may change the display mode of the information display area 49 based on the output from the switch 52 and cycle through: the total operating time display mode, the after-reset operating time display mode, the instantaneous fuel consumption display mode, the average fuel consumption display mode, and the amount of used fuel display mode in the stated sequence, and when it is detected, based on the output of the work state detection means, that the work vehicle is in a work state, the display mode of the information display area 49 may be changed based on the output from the timer 44A, and cycled through: the instantaneous fuel consumption display mode, the average fuel consumption display mode, and amount of used fuel display mode in the stated sequence.

The work state detection means may include a PTO switch 35, a rotation sensor which detects rotation of the PTO axis 6, a clutch sensor which detects engagement and disengagement of the implement clutch, a fourth lever sensor 37 which detects the operation position of the raising-and-lowering lever 36, and the arm sensor 38 which detects the vertical pivot angle of the lift arm 19, and the main ECU 23 which receives the outputs from each of those sensors.

[15] The display control unit 44 may be configured to reset the operating time of the engine 1, average fuel consumption, and amount of used fuel after reset collectively if the reset command which the reset command device 52B outputs is received, when the display mode of the information display area 49 is switched to the after-reset operating time display mode, the average fuel consumption display mode, or amount of used fuel display mode.

[16] The display device 43 may include a liquid crystal display area of a dot matrix type, or a LED display area of the segment display type or the dot matrix type, etc.

[17] The display device 43 may only use liter or gallon as the displayed unit, without switching between liter and gallon as the displayed unit in the information display area 49.

[18] The units of cubic centimeter/second (cc/sec) or cubic centimeter/minutes (cc/min) as the displayed unit for the fuel consumption in the information display area 49. Further, the display may be configured such that the displayed unit in the information display area 49 may be switched to the liter display, the gallon display, and the cubic centimeter display.

[19] The information display area 49 may be a liquid crystal display of a dot matrix type, or an LED of the segment display type or the dot matrix system, etc.

[20] Each of the display switching command device 52A and the reset command device 52B may be an independent switch for exclusive use. Moreover, the display switching command device 52A and the reset command device 52B may be configured as a single multi-contact switch.

[21] The reset command device 52B may be configured to issue a reset command based on an opening or closing of the cap which is detected by a cap sensor which detects opening and closing of the cap of the fuel tank. And, the operating time of the engine after a refuel may be displayed in the after-reset operating time display mode of the information display area 49, the average fuel consumption after the refuel may be displayed in the average fuel consumption display mode of the information display area 49, and the amount of used fuel after the refuel is displayed in the amount of used fuel display mode of the information display area 49.

[22] The reset command device 52B may be configured to issue a reset command based on the increase of the amount of the remaining fuel, which is detected by a remaining fuel sensor 50 which detects the amount of remaining fuel. And, the operating time of the engine after a refuel may be displayed in the after-reset operating time display mode of the information display area 49, the average fuel consumption after the refuel may be displayed in the average fuel consumption display mode of the information display area 49, and the amount of used fuel after the refuel is displayed in the amount of used fuel display mode of the information display area 49.

[23] The reset command device 52B may be configured to issue a reset command when it receives an output from the rotation sensor 17, which detects the output rotational speed of the engine 1, at the time the rotational speed of the engine 1 reaches a set rotational speed from zero. And, the operating time of the engine after an engine start-up may be displayed in the after-reset operating time display mode of the information display area 49, the average fuel consumption after the engine start-up may be displayed in the average fuel consumption display mode of the information display area 49, and the amount of used fuel after the engine start-up is displayed in the amount of used fuel display mode of the information display area 49.

[24] The reset command device 52B may be configured to issue a reset command based on operation of a key switch 53 to an engine-start up position. And, the operating time of the engine after an engine start-up may be displayed in the after-reset operating time display mode of the information display area 49, the average fuel consumption after the engine start-up may be displayed in the average fuel consumption display mode of the information display area 49, and the amount of used fuel after the engine start-up is displayed in the amount of used fuel display mode of the information display area 49.

[25] A plurality of reset command devices 52B and selection means, such as a switch which enables selection of the reset command device 52B to be provided.

[26] The display switching command device 52A may be a single switch 52 and may be configured to output a display switching command with the single switch 52 based on a short press-down operation, and to issue a reset command based on a long press-down operation. And, the display control unit 44 may be configured to switch the display mode of the information display area 49, to the operating time display mode, the instantaneous fuel consumption display mode, the average fuel consumption display mode, and amount of used fuel display mode based on short press-down operations of the switch 52, and to reset the average fuel consumption and amount of used fuel are reset based on a long press-down operation of the switch 52, As described above, a display system for a work vehicle according to the present invention is applicable to an agricultural work vehicle such as a rice planting machine and a combine harvester, or a construction work vehicle such as backhoe, a wheel loader, in addition to a tractor.

What is claimed is:
1. A display system for a work vehicle comprising:
a display device having an information display area;
a display control unit for controlling the display device for reading and displaying written and stored information;
a display switching command device which outputs a display switching command for switching a display in the display device;
a rotation sensor for detecting an output rotational speed of an engine; and
a key switch,
wherein the display control unit selects and sets, based on an output from the display switching command device, one or more of an operating time display mode for displaying an operating time of an engine, an instantaneous fuel consumption display mode for displaying an instantaneous fuel consumption, an average fuel consumption display mode for displaying an average fuel consumption, and an amount of used fuel display mode for displaying an amount of used fuel, as a display mode for the information display area,
wherein, when the display control unit is stopped by the key switch, a storing operation is performed to readably store a total operating time of the engine, the operating time of the engine after a reset thereof, the average fuel consumption or the average fuel consumption after a reset thereof, and the amount of used fuel or the amount of the fuel used after a reset thereof, which have been computed until the output rotational speed falls below to a second predetermined rotational speed; and
wherein, when the output rotational speed detected by the rotation sensor becomes greater than or equal to a first predetermined rotational speed and then an engine stall is determined by detecting the output rotational speed fallen below the second predetermined rotational speed, the storing operation is performed to readably store the total operating time of the engine, the operating time of the engine after a reset thereof, the average fuel consumption or the average fuel consumption after a reset thereof, and the amount of used fuel or the amount of the fuel used after a reset thereof, which have been computed until the output rotational speed falls below the second predetermined rotational speed.
2. A display system for a work vehicle according to claim 1, further comprising:

a reset command device which outputs a reset command for the operating time of the engine, wherein the display control unit resets the operating time of the engine based on the reset command from the reset command device, and the operating time display mode includes a total operating time display mode for displaying a total operating time of the engine and an after-reset operating time display mode for displaying the operating time of the engine after a reset.

3. A display system for a work vehicle according to claim 2, wherein the reset command device outputs a reset command for resetting the average fuel consumption display, and the display control unit resets the average fuel consumption display based on the average fuel consumption reset command, and displays an average fuel consumption after the reset in the average fuel consumption display mode.

4. A display system for a work vehicle according to claim 2, wherein the reset command device outputs a reset command for resetting the amount of used fuel display, and wherein the amount of used fuel display is reset based on the amount of used fuel reset command from the reset command device, and an amount of used fuel after the reset is displayed in the amount of used fuel display mode.

5. A display system for a work vehicle according to claim 2, wherein the display switching command device includes a manually operated switch and outputs a generated switch signal to the display control unit.

6. A display system for a work vehicle according to claim 5, wherein the display control unit cyclically sets the display mode of the information display area through: the total operating time display mode, the after-reset operating time display mode, the instantaneous fuel consumption display mode, the average fuel consumption display mode, and the amount of used fuel display mode, based on switch signals sequentially outputted by the switch, in the stated sequence.

7. A display system for a work vehicle according to claim 5, wherein the manually operated switch is also used as the reset command device.

8. A display system for a work vehicle according to claim 7, wherein a switch signal outputted as a result of a short pressing-down operation of the manually operated switch is used as the display switching command, and a switch signal outputted as a result of a long pressing-down operation of the manually operated switch is used as the reset command.

* * * * *